(12) United States Patent
Lam et al.

(10) Patent No.: US 7,466,918 B1
(45) Date of Patent: *Dec. 16, 2008

(54) WAVELENGTH ALLOCATION IN REGIONAL ACCESS NETWORK WITH OPTICAL ADD-DROP MULTIPLEXERS

(75) Inventors: Cedric F. Lam, Irvine, CA (US); Aleksandra Smiljanic, Atlantic Highlands, NJ (US)

(73) Assignee: AT&T Corporation, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/860,213

(22) Filed: Sep. 24, 2007

Related U.S. Application Data

(63) Continuation of application No. 10/377,030, filed on Mar. 3, 2003, now Pat. No. 7,286,760, which is a continuation of application No. 10/180,976, filed on Jun. 27, 2002, now abandoned, which is a continuation of application No. 09/987,708, filed on Nov. 15, 2001, now abandoned.

(51) Int. Cl.
    *H04J 14/00* (2006.01)

(52) U.S. Cl. .......................................... 398/69; 398/83

(58) Field of Classification Search .................. 398/69, 398/83–85
See application file for complete search history.

(56) References Cited

U.S. PATENT DOCUMENTS

| | | | | |
|---|---|---|---|---|
| 4,759,011 A | * | 7/1988 | Hicks, Jr. | ..................... 398/60 |
| 5,963,348 A | | 10/1999 | Oberg | |

\* cited by examiner

*Primary Examiner*—Leslie Pascal
(74) *Attorney, Agent, or Firm*—Banner & Witcoff, Ltd.

(57) ABSTRACT

Wavelength assignment schemes that provide full-connectivity in RANs with fixed-tuned OADMs. In the first scheme, wavelengths are assigned to nodes according to Hadamard code, and in the second scheme, bands of contiguous wavelengths are assigned to nodes. Simulation results show that on the average, the Hadamard wavelength assignment schemes approach the performance of RANs with OADMs that add-drop all wavelengths, while saving 50% of the TDM terminals. The saving of TDM terminals by using wavelength tunable OADMs vary in different cases. Tunable OADMs are advantageous for lower traffic granularity and more interactions of a RAN with the outside network.

4 Claims, 8 Drawing Sheets

FIG. 5(a)

WAVELENGTHS

| NODES | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 1 |
| 2 | 1 | 0 | 1 | 0 | 1 | 0 | 1 | 0 | 1 | 0 | 1 | 0 | 1 | 0 | 1 | 0 |
| 3 | 1 | 1 | 0 | 0 | 1 | 1 | 0 | 0 | 1 | 1 | 0 | 0 | 1 | 1 | 0 | 0 |
| 4 | 1 | 0 | 0 | 1 | 1 | 0 | 0 | 1 | 1 | 0 | 0 | 1 | 1 | 0 | 0 | 1 |
| 5 | 1 | 1 | 1 | 1 | 0 | 0 | 0 | 0 | 1 | 1 | 1 | 1 | 0 | 0 | 0 | 0 |
| 6 | 1 | 0 | 1 | 0 | 0 | 1 | 0 | 1 | 1 | 0 | 1 | 0 | 0 | 1 | 0 | 1 |
| 7 | 1 | 1 | 0 | 0 | 0 | 0 | 1 | 1 | 1 | 0 | 0 | 0 | 0 | 1 | 1 | 1 |
| 8 | 1 | 1 | 1 | 1 | 1 | 1 | 1 | 1 | 1 | 1 | 1 | 1 | 1 | 1 | 1 | 1 |

FIG. 5(b)

WAVELENGTHS

| NODES | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 1 |
| 2 | 1 | 1 | 1 | 1 | 1 | 1 | 1 | 1 | 0 | 0 | 0 | 0 | 0 | 0 | 0 | 0 |
| 3 | 0 | 0 | 1 | 1 | 1 | 1 | 1 | 1 | 1 | 1 | 0 | 0 | 0 | 0 | 0 | 0 |
| 4 | 0 | 0 | 0 | 0 | 1 | 1 | 1 | 1 | 1 | 1 | 1 | 1 | 0 | 0 | 0 | 0 |
| 5 | 0 | 0 | 0 | 0 | 0 | 0 | 1 | 1 | 1 | 1 | 1 | 1 | 1 | 1 | 1 | 0 |
| 6 | 1 | 0 | 0 | 0 | 0 | 0 | 0 | 1 | 1 | 1 | 1 | 1 | 1 | 1 | 1 | 1 |
| 7 | 1 | 1 | 1 | 0 | 0 | 0 | 0 | 0 | 0 | 1 | 1 | 1 | 1 | 1 | 1 | 1 |
| 8 | 1 | 1 | 1 | 1 | 1 | 1 | 1 | 1 | 1 | 1 | 1 | 1 | 1 | 1 | 1 | 1 |

WAVELENGTH ALLOCATION IN REGIONAL ACCESS NETWORK WITH OPTICAL ADD-DROP MULTIPLEXERS

CROSS-REFERENCE TO RELATED APPLICATIONS

This application is a continuation of U.S. patent application Ser. No. 10/377,030, filed Mar. 3, 2003 now U.S. Pat. No. 7,286,760 and titled "Wavelength Allocation in Regional Access Network with Optical Add-Drop Multiplexers," which application is a continuation of U.S. patent application Ser. No. 10/180,976, filed Jun. 27, 2002 and also titled "Wavelength Allocation in Regional Access Network with Optical Add-Drop Multiplexers" (now abandoned), which application is in turn a continuation of U.S. patent application Ser. No. 09/987,708, filed Nov. 15, 2001 and titled "Wavelength Allocation in Regional Access Network with Optical Add-Drop Multiplexers" (now abandoned), all of which are incorporated by reference herein.

BACKGROUND OF THE INVENTION

The present invention is generally directed to the field of communication networks and more particularly, is directed to wavelength allocation in a regional access network with optical add-drop multiplexers.

FIG. 1 illustrates a two-tier wide area network (WAN) as with a regional access network (RAN). As shown in FIG. 1, nodes are divided into backbone and regional nodes. Backbone nodes are equipped with optical cross connects (OXCs), and regional nodes are equipped with less expensive optical add-drop multiplexers (OADMs). The RAN is a bus network between two backbone nodes as encircled in FIG. 1.

Wavelengths are divided into backbone and local wavelengths. Backbone wavelengths pass through the regional nodes without being add/dropped. Regional nodes communicate through local wavelengths. If a connection is requested from an outside network for a node in the RAN, it is carried on a backbone wavelength to the backbone node and then on a local wavelength from the backbone to the regional node. Also, if a connection is requested by a regional node to the outside network, it is carried on a local wavelength from the regional to a backbone node and then on a backbone wavelength to the destination node, the connection being converted at the backbone node. Traffic is carried on bidirectional pairs of fibers.

Adding and dropping all wavelengths at each regional node is appropriate if it exchanges the information only with the adjacent node. A connection may traverse multiple nodes without being dropped at intermediate nodes. Thus, the required number of ports per node should be less than the total number of wavelengths to save cost. It is known in the prior art to minimize the number of OADM ports in RANs assuming static traffic. It is assumed, a priori, node-to-node demand for bandwidth and wavelengths are assigned to be add/dropped at nodes to meet the demand while minimizing the number of OADM ports. Saving of OADM ports in a RAN can be calculated for uniform and distance dependent static traffic patterns. If nodes may request a traction of the bit-rate transported by a single wavelength, the saving is calculated through 'super-node' modeling. Nodes are grouped into 'super-nodes' which request only full wavelength bit-rates.

The prior art as proposed two heuristics to minimize the number of OADM ports in a ring network. and to improve the heuristics by combining them with routing decisions. While WDM optical network in the prior art serve the SONET layer, it serves the ATM layer. At each node, packets on dropped wavelength are either received by that node or routed to the added wavelengths together with the packets generated by that node. Virtual connections are requested and released according to the specified statistics. Blocking probability of connection requests is calculated for the proposed system with reduced number of OADM ports.

With exponentially increasing demand for bandwidth, dynamically reconfigurable optical networks will soon become a reality. In such networks, wavelengths are assigned and released on demand. We analyze the performance of a RAN based on different OADM technologies and with dynamic traffic. Routing is done on-line, so that connections are not rearranged when a new connection is requested. Connections can carry a full bit-rate of wavelengths, or only the portion of it. A connection is carried on a single wavelength, and it is not converted at intermediate nodes. Such a choice simplifies network management. Given this assumption, each pair of nodes in a RAN with fixed-tuned OADMs should have at least one wavelength in common.

SUMMARY OF THE INVENTION

The present invention uses two wavelength assignment schemes which ensure full connectivity while reducing the number of required ports by 50%. The Hadamard assignment scheme evenly distributes the number of wavelengths in common for any pair of nodes, while the banding assignment scheme provides pairs of nodes with different numbers of wavelengths in common.

BRIEF DESCRIPTION OF THE DRAWINGS

The novel features of the present invention are set out with particularity in the appended claims, but the invention will be understood more fully and clearly from the following detailed description of the invention as set forth in the accompanying drawings in which:

FIG. 5 illustrate Hadamard and banding wavelength assignments;

BRIEF DESCRIPTION OF THE PREFERRED EMBODIMENT

The system architecture and wavelength add/drop schemes may be constrained by the actual implementation of the OADMs. An OADM is defined as a network element that has a common input port, a common output port, one or more add and drop ports. Each drop port drops one individual wavelength from the multi-wavelength network traffic connected to the common input port. The remaining wavelengths are combined with the wavelengths of traffic added at the add ports, and emerge from the common output port.

Figure 1:
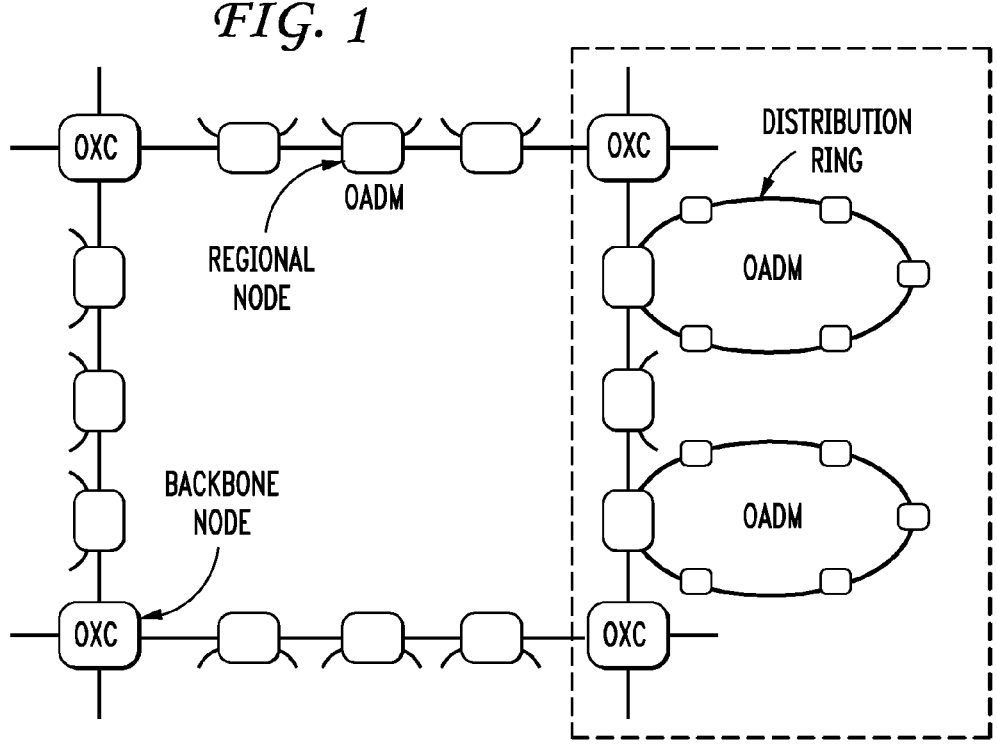
FIG. 1 is a block diagram of a RAN formed as part of a two-tier WAN.
Figure 2A:
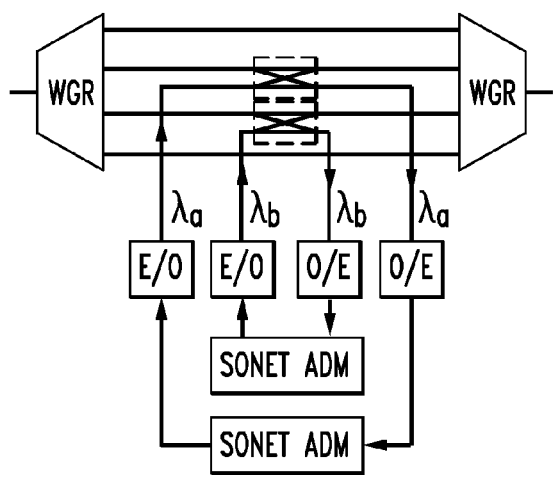
FIG. 2 illustrates OADMs based on WGRs.
Figure 2B:
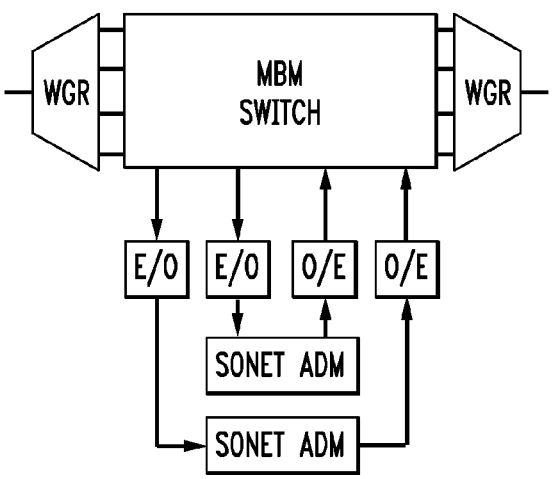

In the simplest form, an OADM can be made with one pair of wavelength demultiplexer/multiplexer and a number of 2×2 optical switches in specified add/drop wavelength paths as shown in FIG. 2. Each wavelength will be add/dropped at the specified port if the associated switch is set to the cross state. If 2×2 optical switches are included in all the arms between the demultiplexer/multiplexes pair, we obtain a full OADM that can add and drop all the wavelengths. Alternatively, the array of 2×2 optical switches can be replaced by (W−I−T)×(W+T) optical cross-connect such as a micro-electro-mechanical (MEM) optical cross-bar switch [9], where T is the number of add/dropped wavelengths. Such design will allow each port to arbitrarily add/drop any of the W wavelengths.

FIG. 2 implies that every wavelength, whether it is expressed or terminated, is demultiplexed at the OADM. A representative demultiplexer and multiplexer achieving this function can be made with an arrayed waveguide router (AWG). This solution is not only expensive but also technically difficult. First, its insertion loss is usually very high which degrades the power budget. Second, if multiple such OADMs are connected, the express wavelengths will pass a cascade of the optical filters. Filter misalignments and narrowing effects could degrade the express wavelength signals significantly. Thirdly, no filter is perfect and there will be multi-path signal leakage problems, resulting in unwanted cross-talk effects in the wavelength channels. Therefore, full wavelength add/dropping may only be desirable at backbone nodes where all the traffic is terminated and regenerated.

Figure 3A:
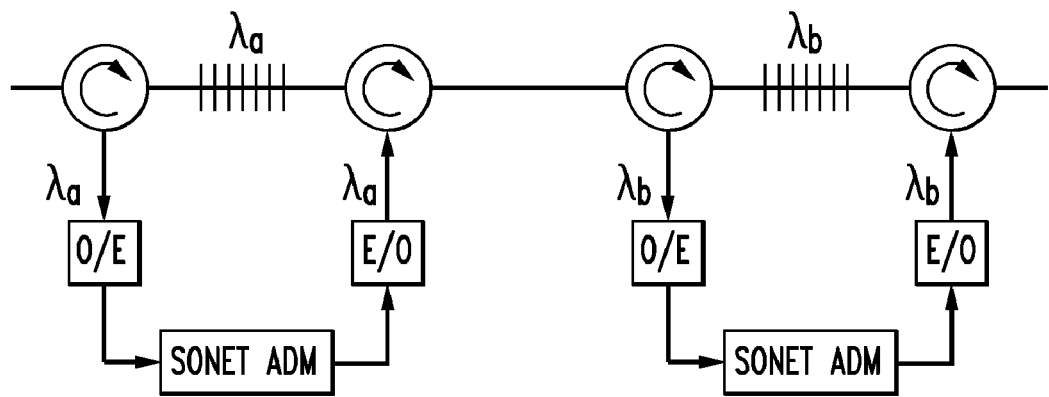
FIG. 3 illustrates OADM's based on fiber gratings.
Figure 3B:
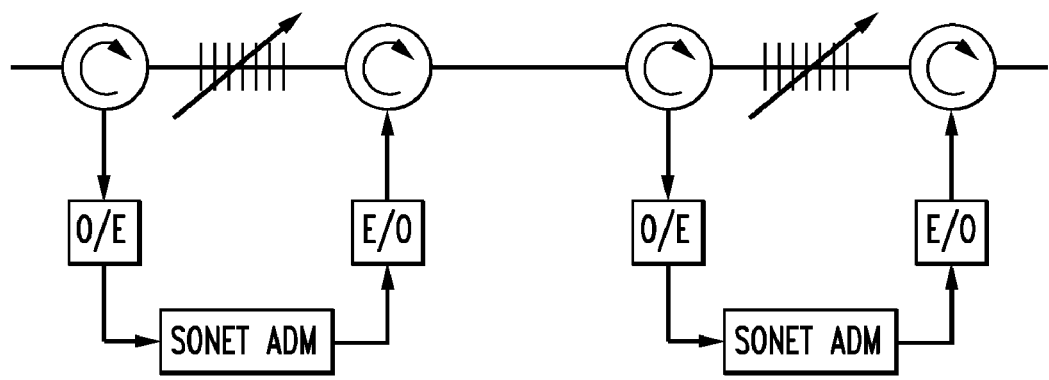

Another commonly used OADM technology is a combination of fiber Bragg grating (FBG) and optical circulators as shown in FIG. 3. An FBG reflects the particular wavelengths it is designed for. It is made as a piece of optical fiber with periodic refractive index variation. Being a very good narrow band wavelength filter, an FBG is physically transparent to the expressed wavelengths. So, there is no signal degradation imposed on those wavelengths. The three-port optical circulators separate the reflected light from the incident light, according to the directions of the photons striking at individual ports. Since FBGs can be made with essentially negligible loss, most of the insertion loss comes from the circulators. To add/drop multiple wavelengths, FBG-circulator structures with different reflection wavelengths can be cascaded. The insertion loss increases linearly with the number of add/dropped wavelengths. In order to reduce the cascading loss seen by the express traffic and to preserve the overall power budget in the network, one may want to "sandwich" multiple gratings between a pair of circulators, and add/drop wavelengths in a hierarchical fashion. This reduces the worst channel loss to a logarithmic dependence on dropped channels. FBGs can be made tunable by changing the grating periodicity either thermally or through mechanical strains. The tuning range is usually only in the neighborhood of only 1 or 2 adjacent wavelengths. It should be noted that in this OADM implementation, pairs of transmitters and receivers are tuned to the same wavelengths.

Figure 4A:
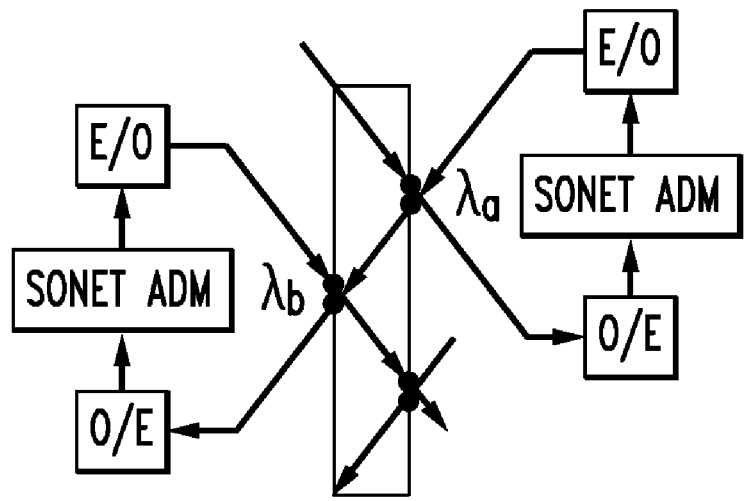
FIG. 4 illustrates OADMs based on thin-film filters.
Figure 4B:
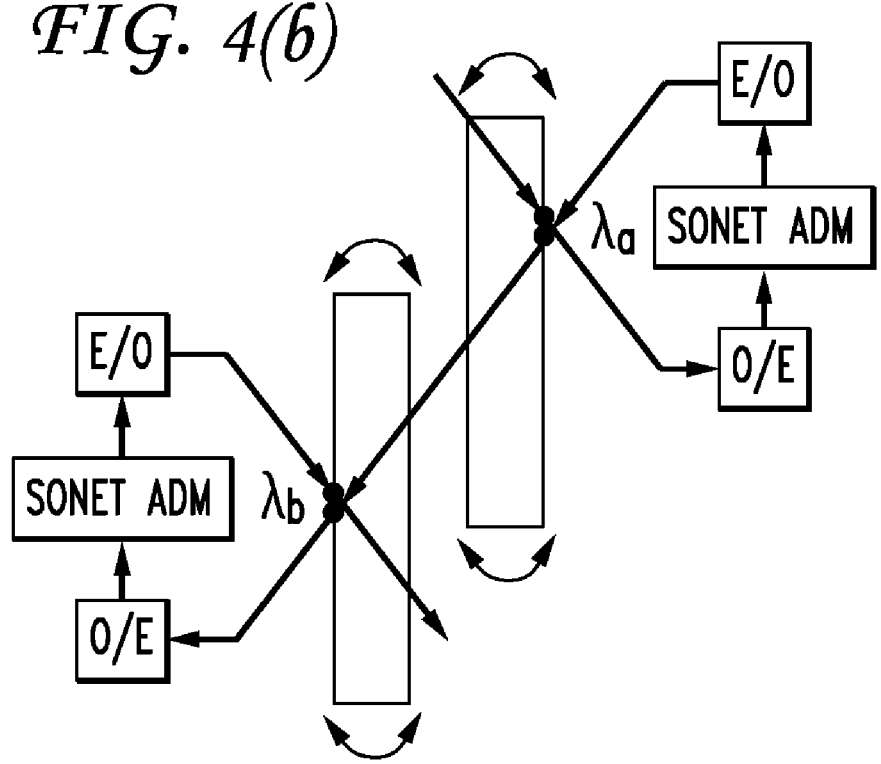
Figure 6A:
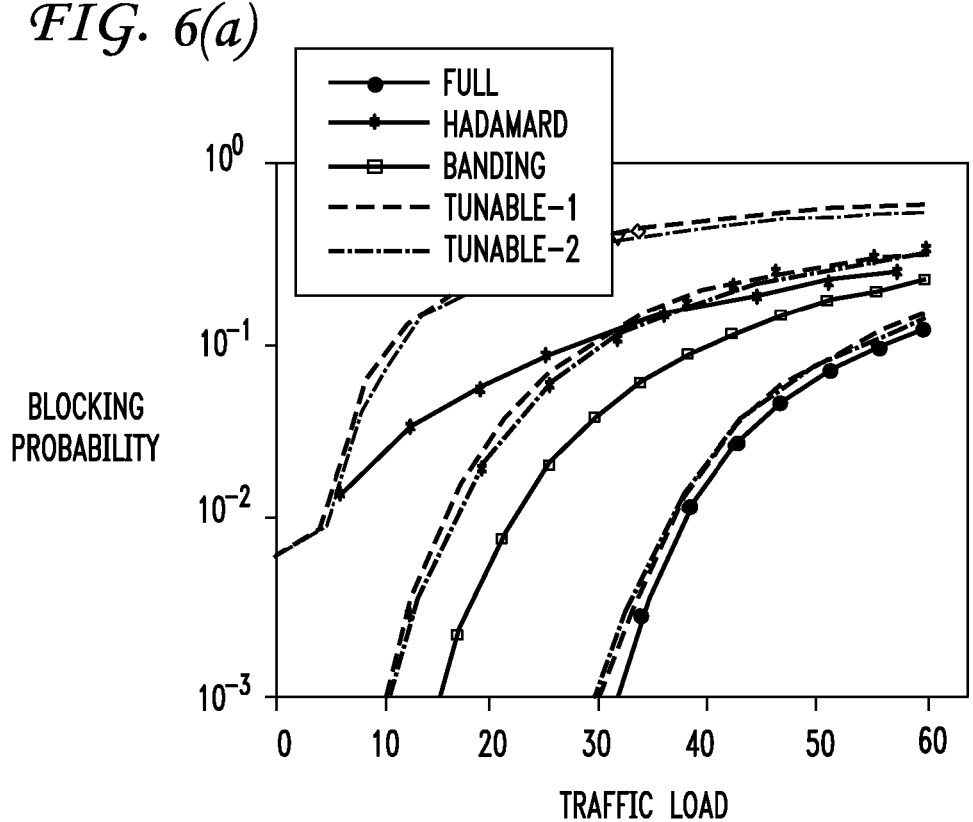
FIG. 6 show graphs of block probability versus traffic load.
Figure 6B:
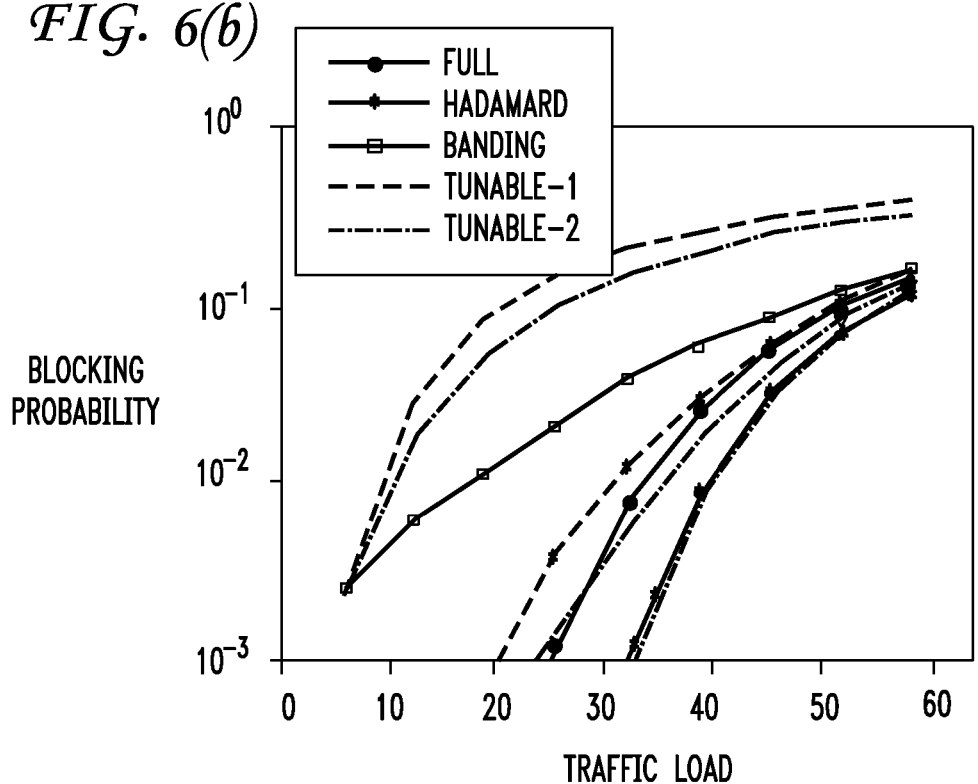
Figure 6C:
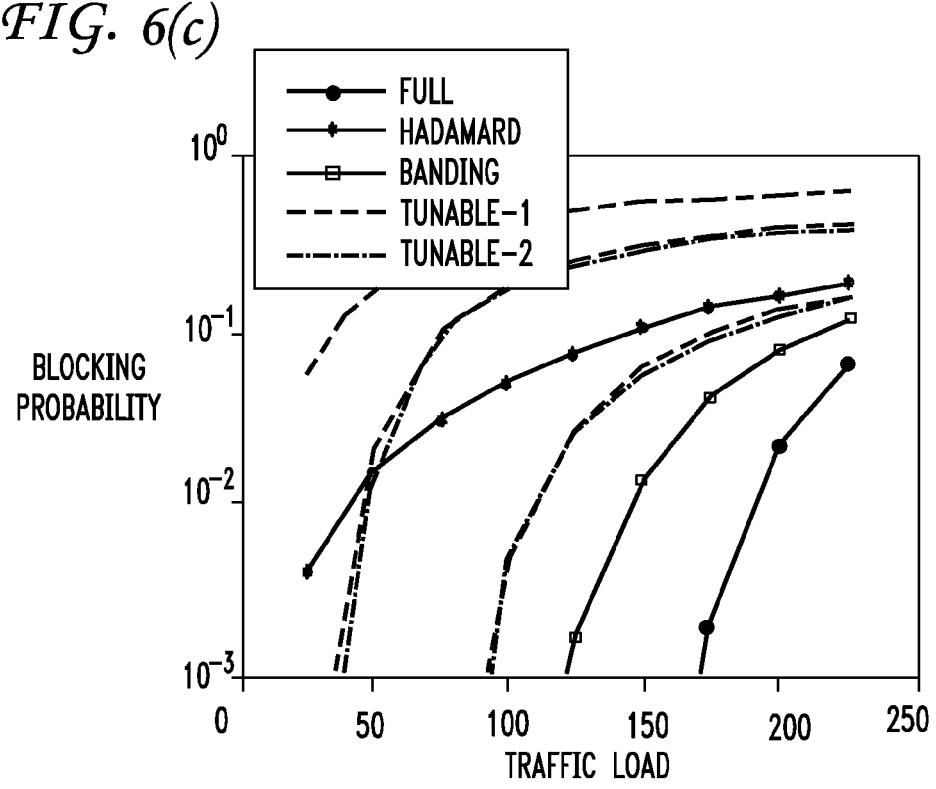
Figure 6D:
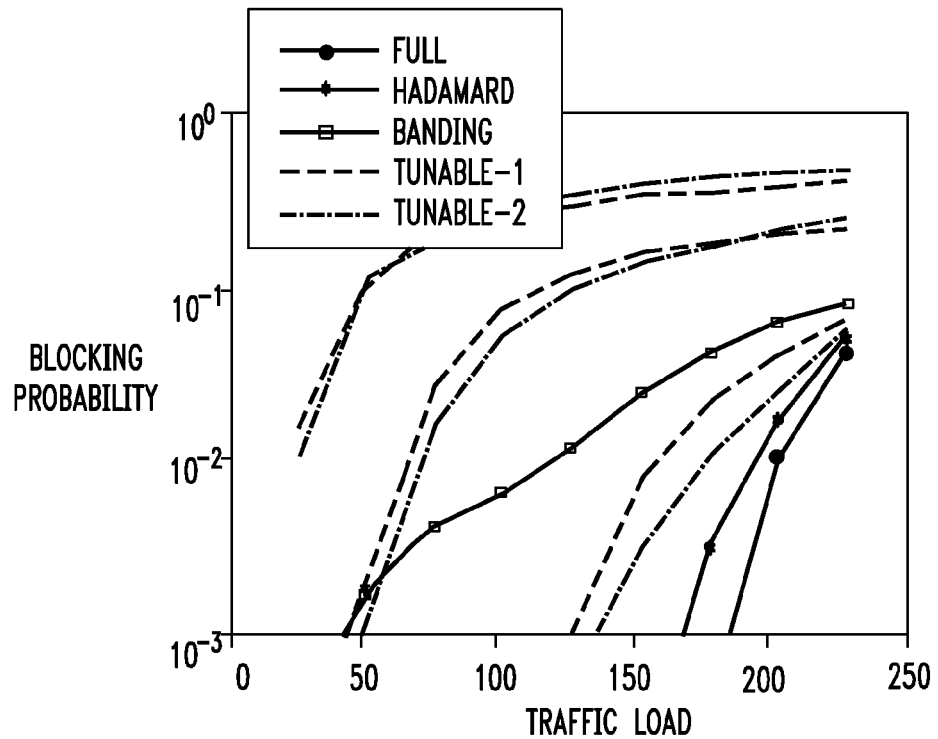
Figure 7A:
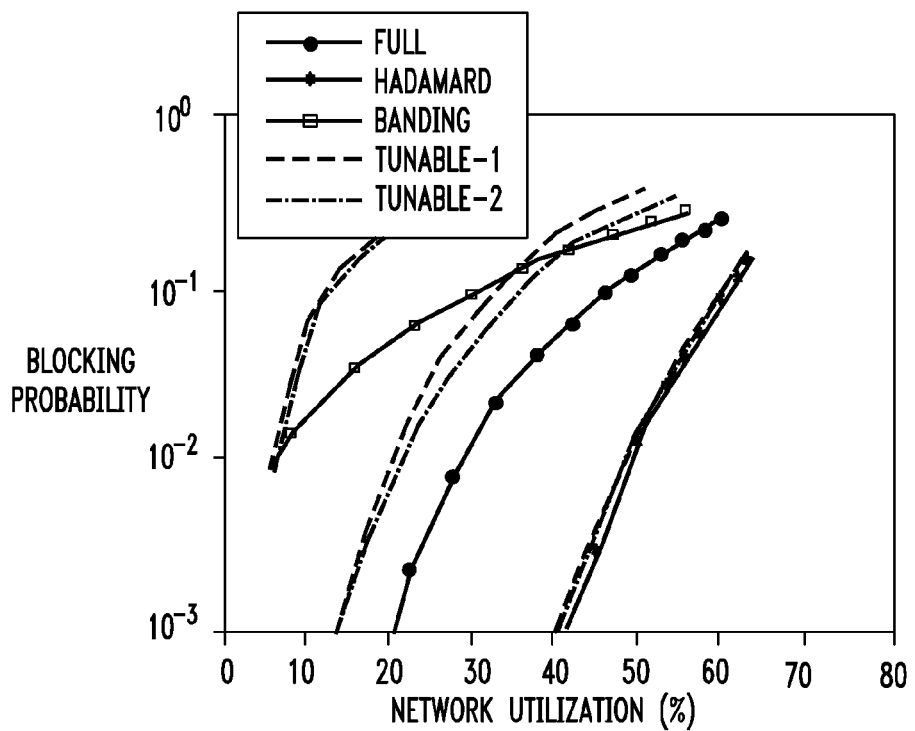
FIG. 7 show blocking probability versus network utilization.
Figure 7B:
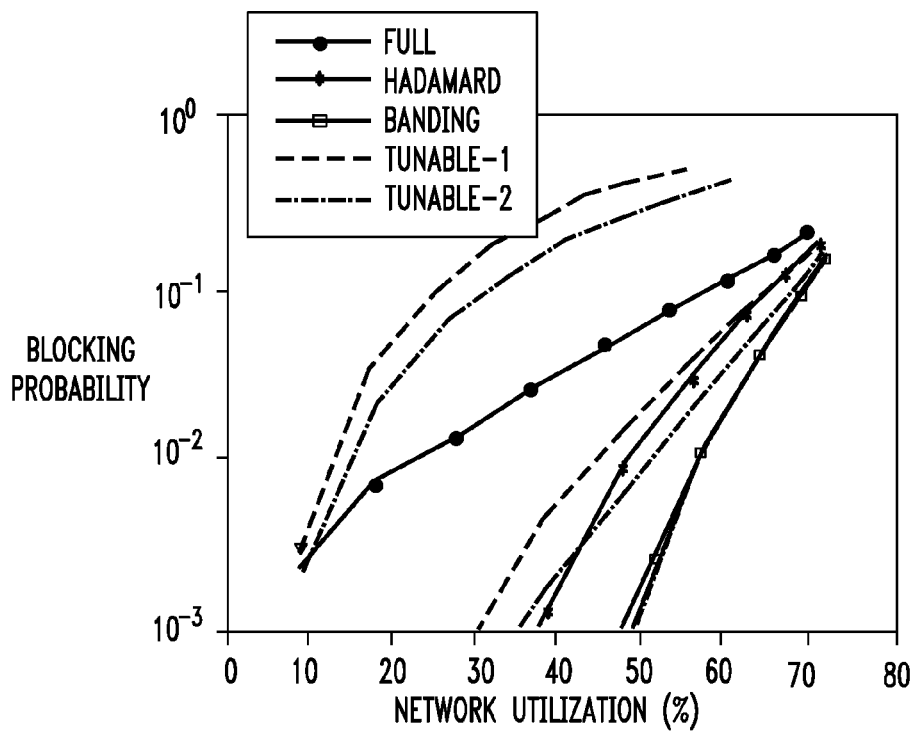
Figure 7C:
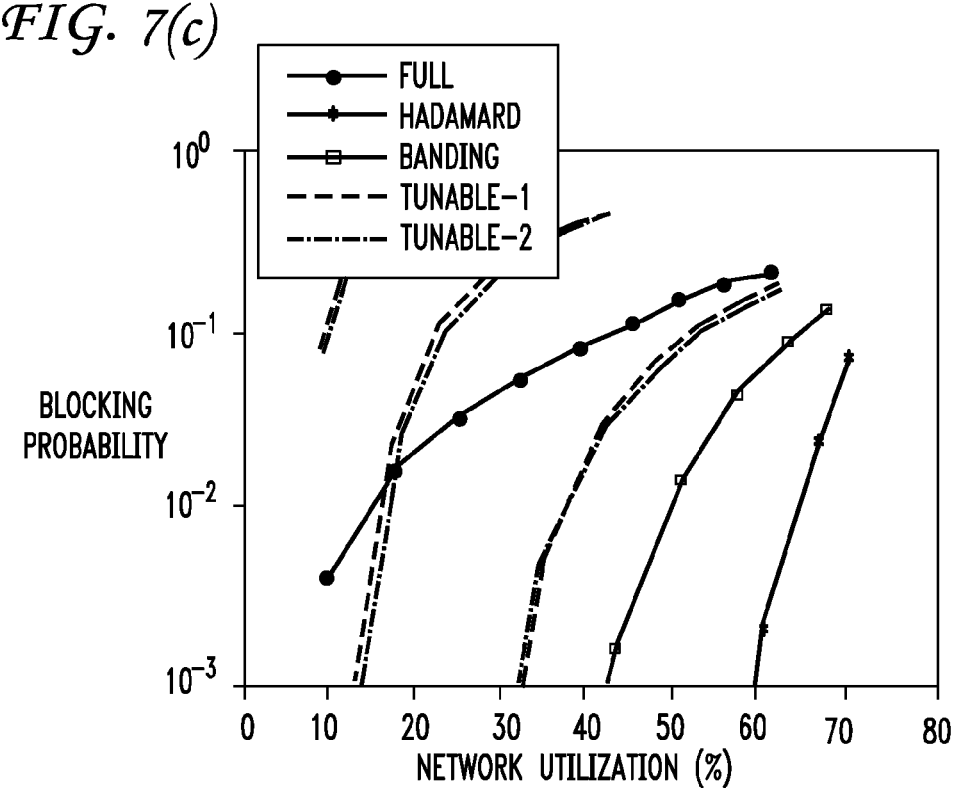
Figure 7D:
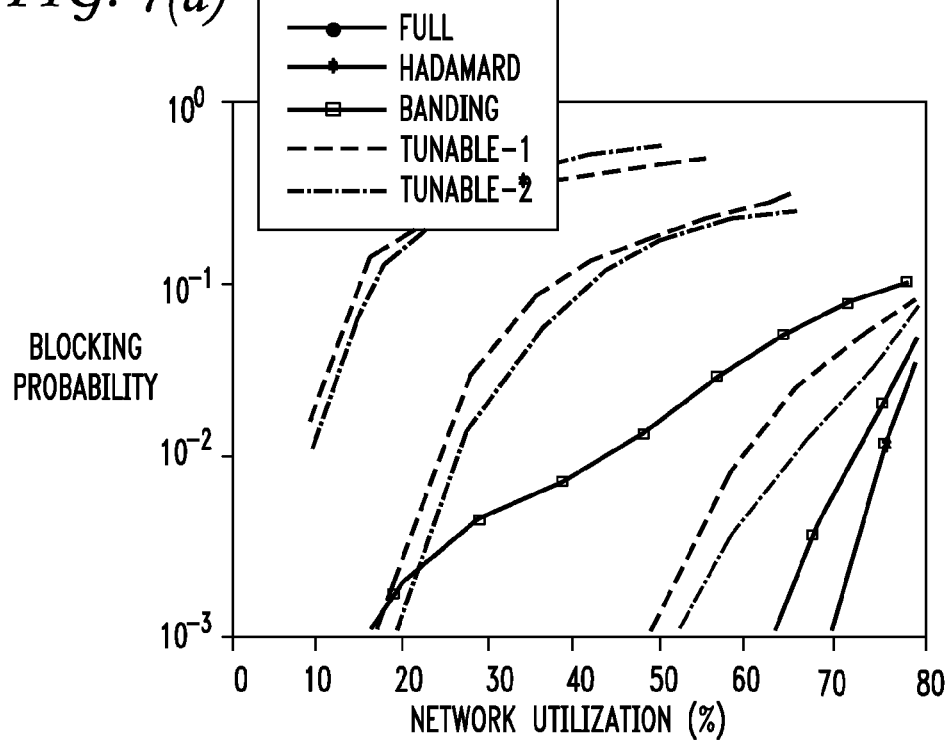

The third type of commonly used OADM technology is a multi-layer thin film filter as shown in FIG. 4. Light is incident at an angle to the filter. The demultiplexed wavelength is passed through while the remaining wavelengths are all reflected. The express wavelengths are not filtered and suffer minimal degradation except the insertion loss. Similar to FBGs, one can demultiplex multiple wavelengths by cascading these filters at a cost of increased insertion loss. However, thin film filters can be made with broad bandwidths covering several consecutive wavelengths. In order to reduce cascading loss to the express traffic, the optical spectrum is usually grouped into bands of consecutive wavelengths. Demultiplexing usually starts with a coarse band-pass filter followed by stages of finer filters. Thin film filters are tuned by changing the incident angle of the light.

Assuming that a connection is carried on only one wavelength, each pair of nodes should have at least one wavelength in common. A wavelength assignment that balances the number of wavelengths in common for any pair of nodes relates well to the construction of error correction codes, as will be explained below. In another scheme, each node adds and drops a different band of wavelengths. These bands are long enough so that they overlap for any pair of nodes. Such banding wavelength assignment has a practical implementation which improves the power budget, as explained in the previous section. Wavelength assignment is defined by vectors $C_i=\{c_{ij}\}1\times w$, $1 \leq i \leq N$, where $c_{ij}=1$ if node i add/drops wavelengths, and $c_{ij}=0$ otherwise. N is the number of nodes in RAN. The weight of vector $C_i$ is defined as follows:

$$\omega(C_i) = \sum_{j=1}^{W} c_{ij}.$$

If the pointwise multiplication of vectors $C_i$ and $C_j$ is defined like:

$$C_i \cdot C_j = \{c_{ik} \cdot c_{jk}\} 1 \times W$$

then nodes i and j have $\omega(C_i \cdot C_j)$ wavelengths in common.

Wavelength assignment may equalize the number of wavelengths in common for any pair of nodes. It holds that:

$$\omega(C_i \cdot C_j) = (\omega(C_i) + \omega(C_j) - \omega(C_i \otimes C_j))/2,$$

where $1 \otimes 0 = 0 \otimes 1 = 1$, $1 \otimes 1 = 0 \otimes 0 = 0$. A block error correction code is defined in the same way as the wavelength assignment: it is a set of binary vectors of the specified length. It tends to maintain $\omega(C_i \otimes C_j)$ approximately equal for an pairs of i,j. Also, ones are evenly spread over all vector coordinates, implying that the same number of nodes tune to any wavelength. If codewords in an error correction code have the same weight, then equation (3) implies that $\omega(C_i \cdot C_j)$ is approximately equal for all pairs i,j. The Hadamard code features this property [12]. It can be shown that in a Hadamard code, $\omega(C_i)=W/2$, $1<i \leq W$, and $\omega(C_i \cdot C_j)=W/4$, $1<i \neq j \leq W$, where complements of codewords are excluded. An example of Hadamard wavelength assignment for W=16 and N=8 is given in Table 5 (a). The all-one codewords are assigned to backbone nodes. The first N−2=6 codewords other than the all-one codeword in Hadamard code are assigned to regional nodes. Any regional node is tuned to W/2=8 wavelengths, and any two regional nodes have W/4=4 wavelengths in common. For example, node 2 add/drops odd wavelengths.

Alternatively, contiguous sets of wavelengths may be assigned to nodes in a RAN. Different bands of wavelengths should be assigned to nodes so that the same number of nodes are tuned to any wavelength. In order to achieve this property, bands of wavelengths assigned to nodes are shifted by W/N, assuming that W/N is an integer. It is easy to conclude that Wit+1 contiguous wavelengths should be assigned to each node in order to ensure full connectivity among nodes. The band that starts at wavelength i and the one that starts at wavelength (W/2+i) mod W have two wavelengths in common. Bands that start at wavelengths i and (W/2+i+kW/N) mod W, k>0, have 1+kW/N wavelengths in common. An example of banding wavelength assignment for W=16 and N=8 is given in Table 5 (b). As in the Hadamard wavelength assignment the all-one codeword are assigned to backbone nodes. For example, node 3 add/drops wavelengths 3-11.

In the case of tunable OADMs, any pair of nodes can communicate as long as there is a wavelength available along the route between them, and an idle transceiver at each site. We will assess the performance of two kinds of tunable OADMs shown in FIGS. 2,3,4 (b). In the first case in FIG. 2 (b), transmitting and receiving wavelengths are independent at each node. In the second case in FIGS. 3,4 (b), a node that transmits at some wavelengths will have to receive traffic at the same wavelengths, and vice versa. In the simulations, we will assess the network performance for different numbers of tunable transmitters and receivers per node.

Connections are dynamically established in the RAN under consideration. Connection requests arrive according to a Poisson point process. An arriving connection is established if there are available resources; in other words, if idle wavelengths and transceivers can be assigned to the new connection. A connection lasts a finite amount of time described by an exponential distribution, before it is released. Such dynamic wavelength assignment is emerging as a result of exponentially increasing demand for bandwidth. An on-line first-fit routing algorithm is used, i.e. the wavelength with the lowest ordinal number is assigned to the newly requested connection while existing connections remain unchanged. Connections requested by nodes outside the RAN and destined for nodes in the RAN are modeled by requests generated by backbone nodes. It is assumed that a given connection is requested from the outside network with probability $P_1$. Also, connections requested in the RAN for nodes outside the RAN are considered only up to the backbone nodes. A connection generated by a node in RAN is destined to the outside network with probability $P_2$. All nodes are identical in terms of traffic that they generate and receive. Nodes might request only a portion of the bit-rate carried by a wavelength. In that case multiple connections with different sources and destinations can use one wavelength on a link. The granularity G denotes the maximum number of connections carried by one wavelength on a link. For example, if wavelengths carry OC-192, and nodes request OC-48, the granularity is G=4.

FIGS. 6 and 7 compare the blocking probability of connection requests for different network parameters in the RAN with fixed-tuned and tunable OADMs. It is assumed that there are W=32 local wavelengths and N=8 nodes in the RAN. The interaction of the RAN with the outside network is represented by parameter $P=P_1=P_2\in\{0, 0.5\}$. Traffic granularity can take values $G\in\{1,4\}$. Tunable OADMs are assumed to contain $T\in\{4, 8, 16\}$ tunable transmitters and receivers. Tunable-1 denotes the case for which transmitters and receivers are independently tunable, while tunable-2 denotes the case for which transmitters and receivers are tuned to the same wavelengths, as explained in Section 3.2. In our simulations a 95% confidence interval is within 1% of the calculated mean value.

FIG. 6 shows the blocking probability as a function of traffic load. As P increases, regional nodes are more likely to communicate with backbone nodes, so there will be fewer spatially longer connections. Consequently, fewer optical transceivers are required per node in order to achieve the performance of full OADM, as can be seen from FIGS. 6 (b) and (d). The blocking probability in a RAN with fixed-tuned OADMs decreases as the granularity increases in accordance with the standard trunking efficiency result in queueing theory. For P=0, G=1, a RAN with fixed-tuned OADMs employing Hadamard wavelength assignment performs significantly poorer than a RAN with full OADMs that terminate all wavelengths, as can be seen from FIG. 6 (a). However, the performance of Hadamard assignment approach the performance of full OADMs as the portion of express traffic (P) and granularity (G) increase, as indicated by FIG. 6 (b), (c), and (d). Namely, for some fixed blocking probability the RAN based on Hadamard assignment accommodates slightly lower offered load than the RAN based on full OADMs. In these realistic cases 50% of TDM terminals can be saved by using the Hadamard wavelength assignment scheme. A RAN based on banding assignment cannot provide low blocking probabilities and accommodate high offered load.

On the other hand, the blocking probability in a RAN with tunable OADMs degrades as the granularity increases. In this case, a tunable transceiver tunes to a particular wavelength even though only a fraction of its bit-rate is requested; so, this wavelength may remain underutilized while the new requested connections are blocked, as seen in FIGS. 6 (c) and (d). For G=1 a tunable OADM with W/2=16 transmitters and receivers achieve the same blocking probability as having a full OADM per node, but for G=4 it provides the lower blocking probability. Two types of tunable OADMs perform similarly. Tunable-2 type OADMs improve the network performance by requiring a node to transmit and receive at the same wavelength. Such requirement avoids unused "gaps" on wavelengths. For lower granularity and higher portion of expressed traffic, a RAN with T=W/4=8 tunable transceivers per node performs as well as RAN based on the Hadamard assignment scheme as can be seen in FIG. 6 (b), and saves 75% of the terminals. In other cases, RANs with fixed-tuned OADMs are advantageous.

FIG. 7 shows the blocking probability as a function of network utilization. A connection length is the number of its constituent node-to-node links. Network utilization is the averaged total length of established connections divided by the network capacity (N−1)·W. If connections are charged proportionally to their length, network utilization measures revenues. The performance curves for a RAN with fixed-tuned and tunable OADMs compare similarly in FIGS. 6 and 7. Note that for a fixed blocking probability, the network utilization increases with increased granularity in a RAN with fixed-tuned OADMs. As a conclusion, finer granularity not only provides more flexible management, but also improves the network utilization.

Tables 1 and 2 below show network utilization with different network parameters W, N, P, G for which different RAN architectures provide blocking probability of 0.01. For granularity G=1, a RAN with tunable OADMs with T=W/4 transceivers approach performance of a RAN based on the Hadamard assignment. So, a RAN with tunable OADMs saves a larger number of TDM terminals (75%). For granularity C=4, a RAN with fixed-tuned OADMs based on the Hadamard assignment outperforms a RAN with tunable OADMs, saving the same number of TDM terminals while achieving higher network utilization.

TABLE 1

Network utilization [%] for 1% blocking probability, G = 1

| W | 32 | | | | 64 | | | | 128 | | | |
|---|---|---|---|---|---|---|---|---|---|---|---|---|
| N | 8 | | 16 | | 8 | | 16 | | 8 | | 16 | |
| P | 0 | 0.5 | 0 | 0.5 | 0 | 0.5 | 0 | 0.5 | 0 | 0.5 | 0 | 0.5 |
| Full | 50 | 60 | 45 | 55 | 60 | 70 | 50 | 65 | 60 | 80 | 55 | 70 |
| Hadamard | 30 | 50 | 30 | 45 | 45 | 65 | 40 | 60 | 50 | 80 | 55 | 70 |
| Banding | 5 | 30 | 10 | 30 | 0 | 30 | 10 | 30 | 0 | 20 | 0 | 35 |
| T = W/2 | 50 | 60 | 45 | 55 | 60 | 70 | 50 | 65 | 60 | 80 | 55 | 70 |
| T = W/4 | 20 | 50 | 35 | 55 | 35 | 65 | 45 | 65 | 40 | 80 | 55 | 70 |
| T = W/8 | 5 | 20 | 10 | 30 | 15 | 30 | 20 | 50 | 15 | 40 | 25 | 35 |

TABLE 2

| | \multicolumn{12}{c}{Network utilization [%] for 1% blocking probability, G = 4} |
|---|---|---|---|---|---|---|---|---|---|---|---|---|
| W | \multicolumn{4}{c|}{32} | \multicolumn{4}{c|}{64} | \multicolumn{4}{c}{128} |
| N | \multicolumn{2}{c|}{8} | \multicolumn{2}{c|}{16} | \multicolumn{2}{c|}{8} | \multicolumn{2}{c|}{16} | \multicolumn{2}{c|}{8} | \multicolumn{2}{c}{16} |
| P | 0 | 0.5 | 0 | 0.5 | 0 | 0.5 | 0 | 0.5 | 0 | 0.5 | 0 | 0.5 |
| Full | 65 | 75 | 60 | 70 | 70 | 80 | 60 | 80 | 70 | 90 | 60 | 80 |
| Hadamard | 50 | 70 | 50 | 70 | 60 | 80 | 55 | 80 | 60 | 90 | 60 | 80 |
| Banding | 15 | 45 | 30 | 45 | 10 | 30 | 25 | 45 | 5 | 30 | 10 | 45 |
| T = W/2 | 35 | 65 | 50 | 70 | 40 | 75 | 50 | 80 | 50 | 90 | 55 | 80 |
| T = W/4 | 15 | 25 | 20 | 40 | 20 | 25 | 25 | 50 | 25 | 40 | 25 | 60 |
| T = W/8 | 0 | 10 | 10 | 15 | 10 | 10 | 10 | 20 | 10 | 20 | 10 | 15 |

In accordance with the present invention, a RAN is a part of the two-tier WAN. Regional nodes access only local wavelengths by using OADMs. Two wavelength assignments are used to provide full connectivity among nodes in RAN with fixed-tuned OADMs. Proposed Hadamard wavelength assignment scheme saves 50% of the TDM terminals while approaching the performance of having full OADMs in many cases. The banding wavelength assignment scheme performs poorer. Simulation results indicate that a RAN with tunable OADMs can save up to 75% TDM terminals in certain cases. However, since tunable OADMs involve more sophisticated optical technology, a RAN based on the Hadamard wavelength assignment might be more attractive even in those cases. The saving of TDM terminals by using tunable OADMs increases with the expressed portion of the traffic to and from the WAN, and decreases as the traffic granularity increases. On the other hand, the performance of RANs with fixed-tuned OADMs improves as the traffic granularity increases.

Embodiments of the invention include a wide area network having backbone and regional nodes, said network comprising a plurality of optical add-drop multiplexers coupled to said nodes; wavelength generating means for generating a plurality of wavelengths; wavelength assignment means for assigning selected ones of said wavelength to each of said nodes; and control means coupled to said wavelength assignment means for causing said assignment means to assign said selected ones of said wavelength to said nodes in accordance with a Hadamard code.

It should be obvious from the above-discussed apparatus embodiment that numerous other variations and modifications of the apparatus of this invention are possible, and such will readily occur to those skilled in the art. Accordingly, the scope of this invention is not to be limited to the embodiment disclosed, but is to include any such embodiments as may be encompassed within the scope of the claims appended hereto.

We claim:

1. A system comprising a first plurality of optical add-drop multiplexers, wherein
   each of the optical add-drop multiplexers of the first plurality corresponds to a node in a regional optical network, said regional optical network having a group of wavelengths for use in transmissions over said regional optical network, and
   each of the optical add-drop multiplexers is assigned, in accordance with a Hadamard wavelength assignment scheme, a subset of wavelengths from the group.

2. The system of claim 1, wherein
   $\omega(C_i \cdot C_j)$ is approximately equal for all pairs of optical add-drop multiplexers in the first plurality,
   $C_i$ is a wavelength assignment vector for an optical add-drop multiplexer i of the plurality and is equal to $\{c_{ij}\} 1 \times w$, $1 \leq i \leq N$, where $c_{ij}=1$ if the optical add-drop multiplexer adds/drops wavelength j and $c_{ij}=0$ otherwise, $$\omega(C_i) = \sum_{j=1}^{W} c_{ij} = \text{the weight of vector } C_i,$$

$$C_i \cdot C_j = \{c_{ij} \cdot c_{jj}\} 1 \times W,$$

N is the number of optical add-drop multiplexers in the plurality, and
   W is the number of wavelengths in the group.

3. The system of claim 1, further comprising a second plurality of optical add-drop multiplexers, and wherein
   each of the optical add-drop multiplexers in the first plurality corresponds to a regional node,
   each of the optical add-drop multiplexers in the second plurality corresponds to a backbone node,
   each of the optical add-drop multiplexers of the first plurality is assigned less than all wavelengths of the group, and
   each of the optical add-drop multiplexers of the second plurality is assigned all the wavelengths of the group.

4. The system of claim 3, wherein at least a portion of the optical add-drop multiplexers in the first plurality are tunable.

* * * * *